Feb. 6, 1968   R. CLAREN ETAL   3,368,027
INSULATING DEVICE FOR SUPPORTING A BUNDLE OF CONDUCTORS
IN HIGH VOLTAGE ELECTRIC LINES
Filed Feb. 17, 1967   2 Sheets-Sheet 1
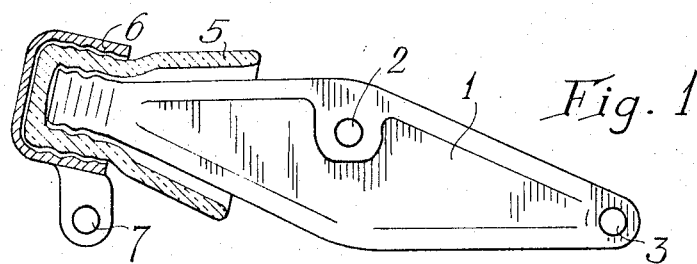
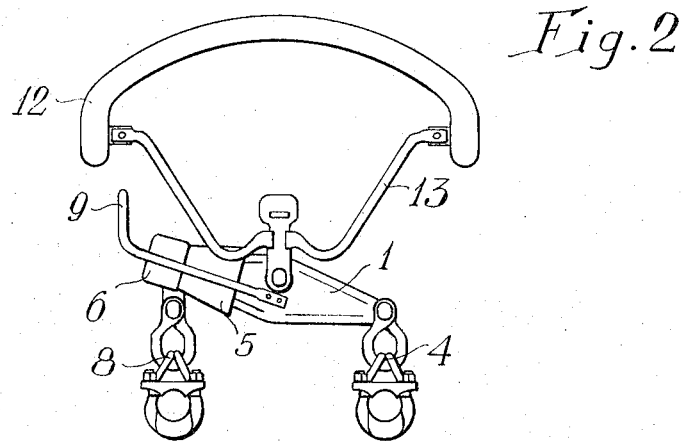
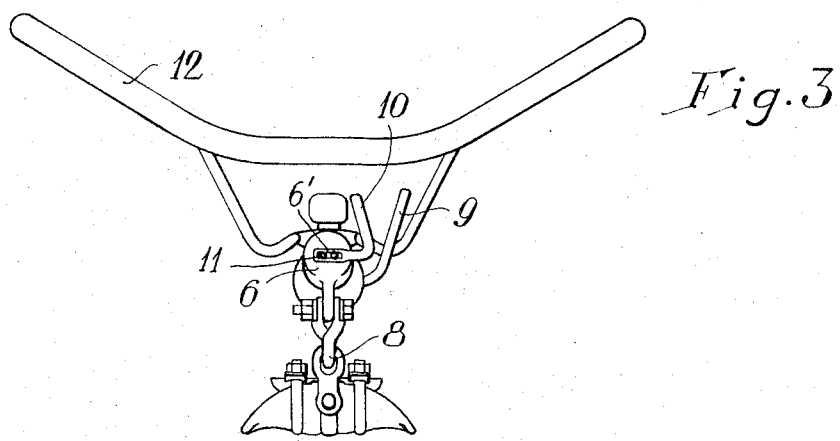
INVENTORS
RODOLFO CLAREN
DOMINIQUE RIVIERE
BY
ATTORNEY

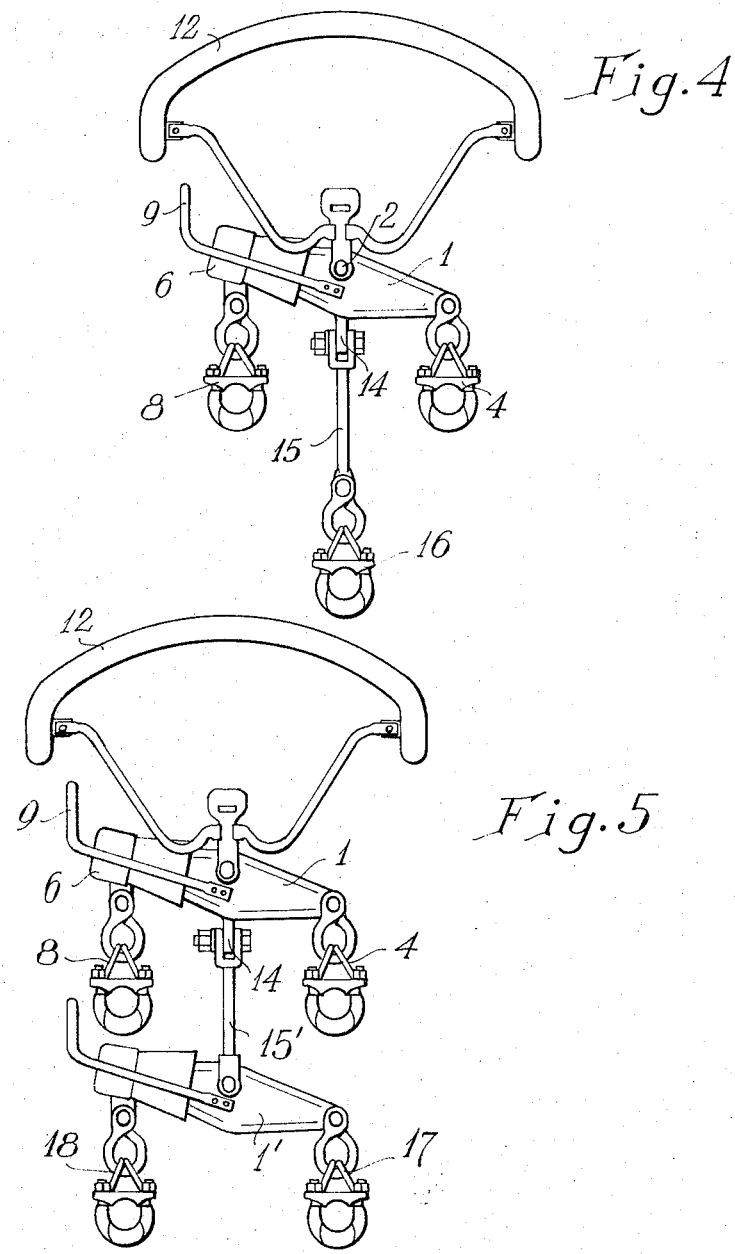

United States Patent Office 3,368,027
Patented Feb. 6, 1968

3,368,027
INSULATING DEVICE FOR SUPPORTING A BUNDLE OF CONDUCTORS IN HIGH VOLTAGE ELECTRIC LINES
Rodolfo Claren, Milan, Italy, and Dominique Riviere, Paris, France, assignors to A. Salvi and Co. S.p.A., Milan, Italy, a corporation of Italy and Società Sediver, Paris, France, a French corporate body
Filed Feb. 17, 1967, Ser. No. 616,922
Claims priority, application Italy, Feb. 23, 1966, 14,822/66, Patent 760,175
8 Claims. (Cl. 174—140)

ABSTRACT OF THE DISCLOSURE

A device for supporting a bundle of conductors in high voltage electric lines particularly for enabling such lines to be used as information transmission carriers includes a metal bar on which is fixed at one end an insulating cap and a metal cap thereover. The metal cap carries a support for one conductor of the bundle, and the opposite end of the bar carries a support for another conductor. The device further includes a spark gap and a guard ring to protect the insulator cap. A suspension rod or a further like metal bar may be added for supporting an additional one or two conductors.

Brief summary of invention

The invention relates to a device for supporting a bundle of conductors in high voltage electric lines, particularly for enabling such lines to be used as information carriers.

Each of the phases of a high voltage line is generally made of a single metal conductor. It is known to use such conductors in high voltage lines as information transmission carriers. More recently, however, the use of bundles of two, three or four conductors for each phase in a high voltage line has come into widespread use.

An object of the present invention is to provide an arrangement enabling the conductors of a bundle to be used as carriers of the different phases of an information transmission system on carrier frequency. A further object of the invention is to provide a novel insulating and spacing device for electrical conductors.

According to the invention, there is provided a device for supporting a bundle of conductors in high voltage electric lines, particularly for enabling such bundle to be used as information transmission carrier, comprising at least one spacer element for supporting at least two conductors of the bundle, one end of the spacer element carrying insulating means for supporting one of the conductors in insulating relationship with respect to the other conductor. The spacer element includes a metal bar adapted to be suspended from its center and to carry support means at each of its two ends for supporting the conductors of the bundle, the insulating means being interposed between one end of the bar and the conductor support means at that end. More particularly, the insulating means comprises an insulating cap fixed to the bar at one end thereof, there being a metal cap fixed to the insulating cap. The conductor support means are fixed to the metal cap.

The novel device of the present invention also permits the connection of a suspension rod to be suspended from the center of the metal bar, and a supporting means carried by the suspension rod for supporting a third conductor of the bundle. Alternatively, a second metal bar may be supported in suspension from the first metal bar, the second metal bar including further support means at each of its two ends for supporting a third and fourth electrical conductor of the bundle. The second metal bar also includes insulating means interposed between one end of the bar and the conductor support means at that end.

Further objects and features of the invention will be apparent from the description below.

Brief description of drawings

The invention is herein described with reference to the accompanying drawings which illustrate, by way of example only, several preferred embodiments of the invention. In the drawings:

FIG. 1 is a front plan view, partly in section, of a spacer device constructed in accordance with the invention;

FIG. 2 is a front plan view of the device of FIG. 1 assembled with the conductor supports and the spark gap;

FIG. 3 is a lateral elevational view of the device of FIG. 2;

FIG. 4 is a front plan view of a modified arrangement; and

FIG. 5 is a front plan view of a further modified arrangement.

Detailed description

With reference to FIG. 1 there is shown a spacer element including a metal bar 1 substantially of rhombic shape. At a point along the centre line of bar 1, there is formed an eyelet or grommet 2 which is used for supporting the device in suspension, such as from a chain of insulators. A further eyelet or grommet 3 is formed at one end of bar 1 and to this is directly attached a suspension ring 4 (FIG. 2) of known construction for supporting one of the conductors of the bundle in the high voltage line. At the opposite end of metal bar 1, there is provided an insulating cap 5, for example of glass or porcelain, which is disposed over and fixed to the end of the bar. A metal cap 6 is disposed over and fixed to the insulating cap 5. An eyelet or grommet 7 is formed on a projection of the metal cap 6, and this is used for supporting a second suspension ring 8 (FIG. 2) for a second conductor of the bundle. Thus, the conductors supported by suspension rings 4 and 8 are maintained in spaced insulated relationship. The metal bar 1 is so shaped as to maintain the two eyelets 3 and 7, or the corresponding suspended conductors, in the same horizontal plane.

The device includes a spark gap having a pair of arcing horns 9 and 10 (FIGS. 2 and 3). Arcing horn 9 is fastened to metal plate 1, and arcing horn 10 is fastened to metal cap 6, the latter preferably having a slot 6' or other construction to which arcing horn 10 is fastened, as by bolt 11, to enable adjustment of the arcing horn and thereby of the arc firing voltage. A guard ring 12 is provided on a support element 13 fixed to the eyelet or grommet 2 of metal bar 1 by means of which the latter is supported to the chain of insulators. The arcing horns 9 and 10 are located adjacent to the guard ring 12 so that any arcing that may occur on them is attracted to the guard ring and away from the insulating cap 5.

FIG. 4 illustrates an embodiment wherein three conductors of the bundle are maintained in spaced insulated relationship. In this embodiment, the construction is substantially the same as in FIGS. 1–3 except that an extension 14 is provided on metal bar 1 on the same vertical axis as eyelet 2, i.e., at a point along the centre line of the metal bar, and to this extension there is supported a suspension rod 15. The latter carries a suspension ring 16 for supporting the third conductor.

FIG. 5 illustrates an embodiment for supporting a bundle of four conductors. In this case, a second bar 1', of the same construction as the first bar 1 described with respect to FIGS. 1–3, is supported from the first bar 1 by means of the suspension rod 15' (similar to suspension rod 15 in FIG. 4) attached to extension 14 of bar 1. The bar 1' carries at its opposite ends the third and fourth conductor supports 17 and 18. Normally, the conductors carried by supports 4 and 17 would be electrically connected to each other, and would constitute the ground, whereas the conductors carried by supports 8 and 18 would constitute two different carrier frequency transmission lines.

It is to be understood that many changes, variations and applications of the illustrated embodiments may be made within the scope of the invention as defined in the following claims.

We claim:
1. A device for supporting a bundle of conductors in high voltage electric lines, particularly for enabling such lines to be used as information transmission carriers, comprising at least one spacer element for supporting at least two conductors of the bundle, said spacer element including a metal bar adapted to be suspended from a point along its centre line, an insulating cap disposed over and fixed to one end of said metal bar, a metal cap disposed over and fixed to said insulating cap, support means for one of said conductors attached to said metal cap, and support means for the other of said conductors carried at the opposite end of said metal bar.

2. A device according to claim 1, wherein the support means for the other of said conductors is attached directly to the metal bar at said opposite end thereof.

3. A device according to claim 1, wherein said metal bar is substantially of rhombic shape, and wherein both of said conductor supporting means are disposed in the same horizontal plane at said opposite ends of the metal bar.

4. A device according to claim 1, wherein said metal bar includes a suspension rod suspended from a point along the centre line of said metal bar, said suspension rod carrying support means for supporting a third conductor of the bundle in spaced relationship with respect to the first two conductors.

5. A device according to claim 1, wherein a second spacer element is supported in suspension from said metal bar, said second spacer element being of the same construction as the first-mentioned spacer element and carrying conductor support means at opposite ends thereof for supporting a third and a fourth conductor.

6. A device according to claim 1, further including a spark gap having a pair of arcing horns, one of said arcing horns being fixed to said metal bar and the other of said arcing horns being fixed to said metal cap.

7. A device according to claim 6, wherein said latter arcing horn is adjustably mounted on said metal cap.

8. A device according to claim 6, further including a guard ring, said arcing horns being located adjacent to the guard ring to attract arcing to the guard ring and away from said insulator cap.

References Cited

UNITED STATES PATENTS

| | | | |
|---|---|---|---|
| 838,537 | 12/1906 | Hamilton | 174—149 |
| 1,248,502 | 12/1917 | Kyle | 174—149 X |
| 2,356,052 | 8/1944 | Hanna | 174—144 X |
| 3,095,471 | 6/1963 | Price | 174—148 X |

LARAMIE E. ASKIN, *Primary Examiner.*